(12) United States Patent
Ito (10) Patent No.: US 6,468,170 B1
(45) Date of Patent: Oct. 22, 2002

(54) V-PULLEY CONTROL MECHANISM FOR VARIABLE-SPEED DRIVE OF BELT TYPE (75) Inventor: Joji Ito, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/522,180

(22) Filed: Mar. 9, 2000

(30) Foreign Application Priority Data

Mar. 31, 1999 (JP) .......................................... 11-092102

(51) Int. Cl.[7] .............................................. F16H 61/00
(52) U.S. Cl. ...................................................... 474/18
(58) Field of Search .............................. 474/18, 23, 27, 474/28, 30, 74; 192/93 A, 94, 70.23, 35

(56) References Cited

U.S. PATENT DOCUMENTS

| 4,946,424 A | * | 8/1990 | Sakakibara et al. | ........... 474/11 |
| 4,995,283 A | * | 2/1991 | Sawasaki et al. | ............. 74/866 |
| 5,188,007 A | * | 2/1993 | Hattori et al. | ................. 74/867 |
| 5,243,881 A | * | 9/1993 | Hayashi | ....................... 74/856 |
| 5,334,102 A | * | 8/1994 | Sato | ............................. 474/18 |
| 5,421,440 A | * | 6/1995 | Kumagai | ..................... 192/90 |
| 5,503,602 A | * | 4/1996 | Dick | .......................... 475/204 |
| 5,810,141 A | * | 9/1998 | Organek et al. | .............. 192/35 |
| 5,984,068 A | * | 11/1999 | Reed, Jr. | ................... 192/84.6 |
| 5,992,592 A | * | 11/1999 | Showalter | .................. 192/43.1 |
| 6,167,997 B1 | * | 1/2001 | Keeney | ....................... 192/40 |

FOREIGN PATENT DOCUMENTS

GB            285407     *  5/1988   ........... F16H/11/04

* cited by examiner

Primary Examiner—Thomas R. Hannon
Assistant Examiner—Vicky A. Johnson
(74) Attorney, Agent, or Firm—Miles & Stockbridge P.C.

(57) ABSTRACT

In a V-pulley control mechanism for a variable-speed drive of belt type in which driving of a V-pulley of the variable-speed drive of belt type is controlled by a motor, the V-pulley control mechanism is disposed between the motor and the V-pulley and comprises a clutch tightening portion, a clutch mechanism which can be tightened by the clutch tightening portion, and a one-way clutch portion.

6 Claims, 11 Drawing Sheets

V-PULLEY CONTROL MECHANISM FOR VARIABLE-SPEED DRIVE OF BELT TYPE

BACKGROUND OF THE INVENTION

1. Field of the Invention

The present invention relates to an improvement in a V-pulley control mechanism for a variable-speed drive of belt type used as a transmission of a vehicle such as a motor vehicle.

2. Related Background Art

In recent years, in place of a conventional automatic transmission (AT), a variable-speed drive of belt type in which a speed can be changed in a stageless fashion has been used as a transmission of a vehicle such as a motor vehicle. The reason is that the variable-speed drive of belt type does almost not have speed change shock and has higher transmission efficiency than that of the AT and can achieve lower fuel consumption.

As an example of the variable-speed drive of belt type, there is a variable-speed drive of V-belt type comprising two pulleys each having variable V-shaped groove, and an endless metallic belt extending between the pulleys, in which any speed change ratio can be obtained in a stageless fashion by varying widths of the grooves of the pulleys.

Figure 10:
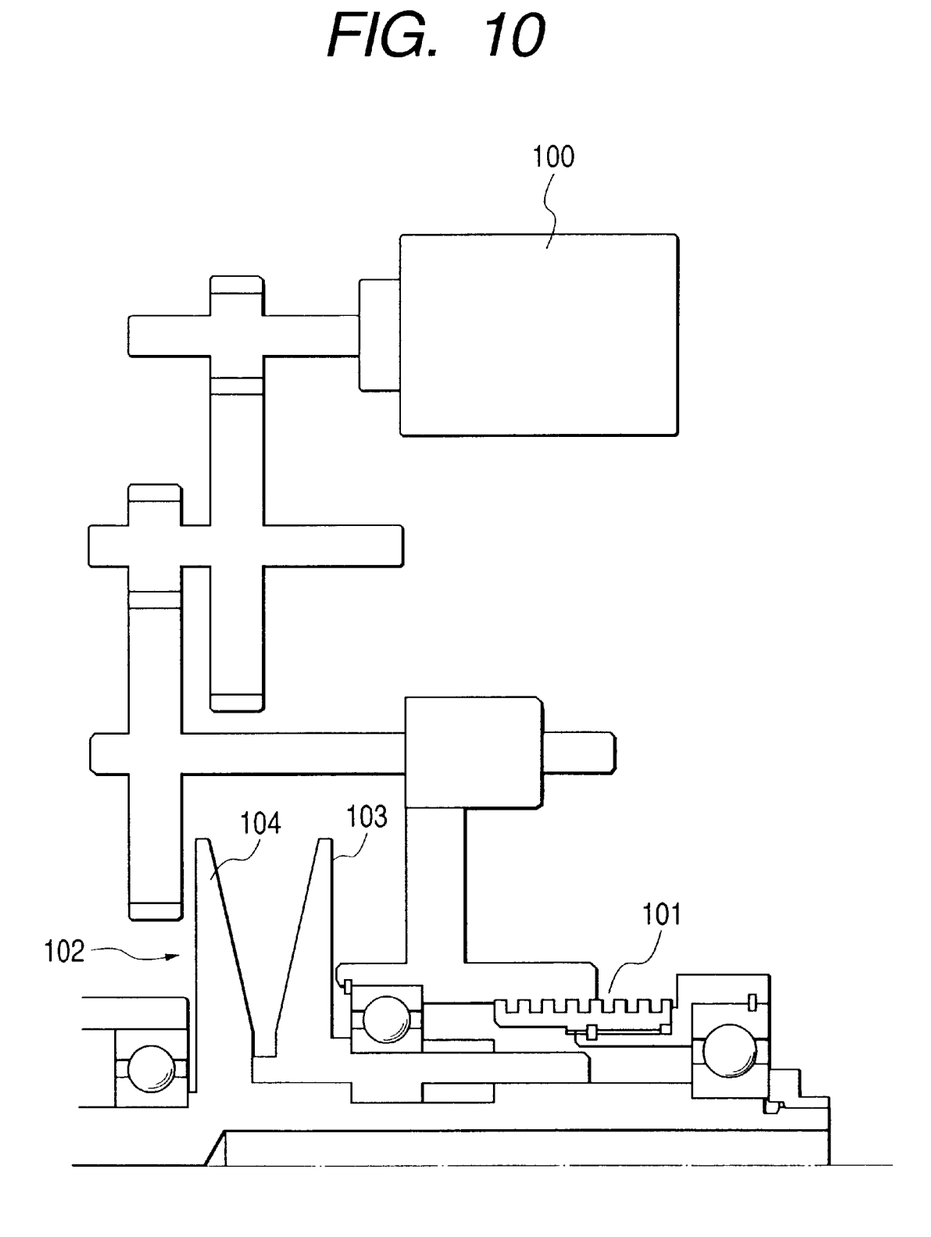
FIG. 10 is an axial sectional view of a conventional V-belt control mechanism of a variable speed drive of V-belt type.

As such a conventional variable-speed drive of belt type, for example, there is a V-belt control mechanism for a variable-speed drive of V-belt type as shown in FIG. 10. In FIG. 10, torque from a drive motor 100 such as an electric motor is converted into a thrust force by a screw mechanism 101 through a plurality of gears. The converted torque shifts a movable sheave 103 of a V-pulley 102 comprised of a movable sheave 103 which can be shifted in an axial direction and a fixed sheave 104 in a thrust direction, with the result that desired speed change ratio can be obtained by increasing or decreasing the width of the V-pulley 102.

Figure 11:
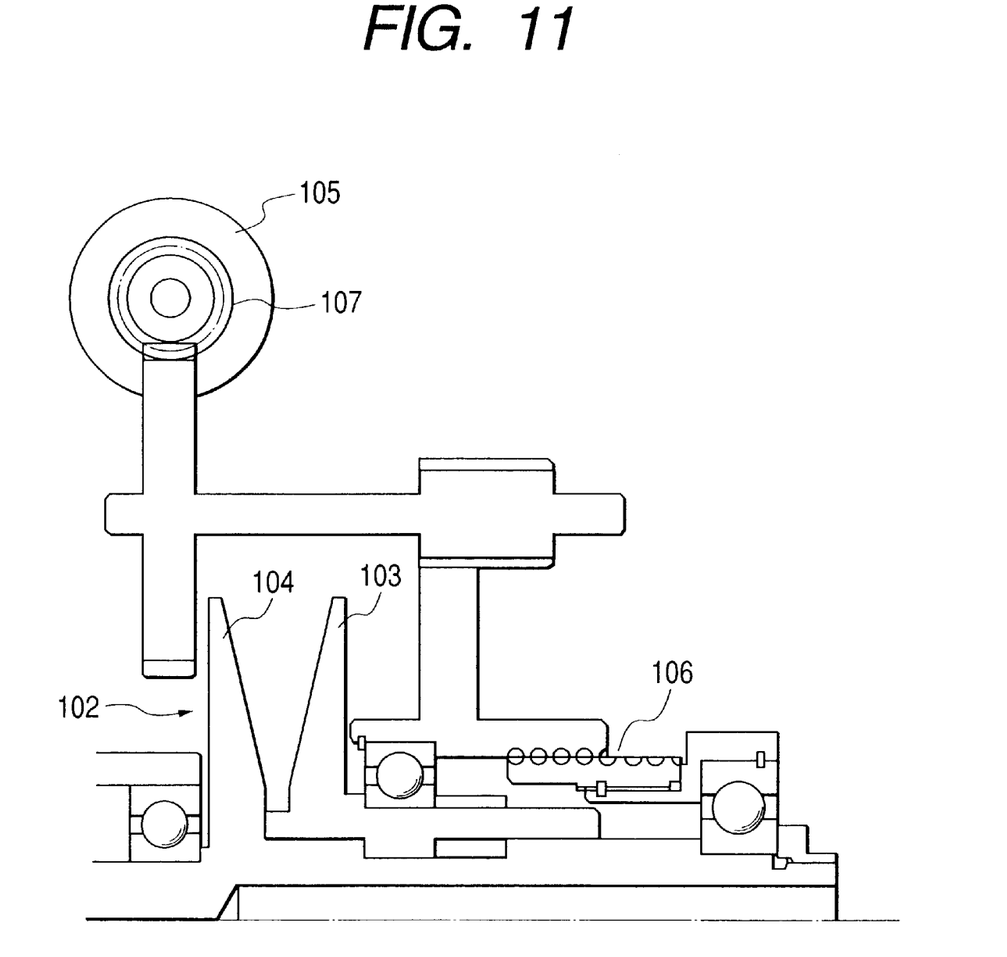
FIG. 11 is an axial sectional view of another conventional V-belt control mechanism of a variable speed drive of V-belt type.

Further, in a conventional V-belt control mechanism for a variable-speed drive of V-belt type as shown in FIG. 11, the screw mechanism of FIG. 10 is replaced by a ball screw mechanism 106, and a worm gear portion 107 is provided between the ball screw mechanism and a drive motor 105, thereby providing a reverse rotation preventing mechanism.

The movable sheave (primary sheave) of the V-pulley is always biased toward a direction for widening the V-pulley by a tension force of the V-belt and a spring force of a secondary pulley. In order to prevent the returning of the movable sheave upon stoppage of the drive motor, a lead angle of the screw portion is set to be smaller. In such a case, however, there is a danger of reducing efficiency for converting the rotational torque into the thrust force. Further, if the ball screw is used in the screw mechanism of the drive portion for the movable sheave of the V-pulley, although the converting efficiency for converting the rotational torque into the thrust force or vice versa is increased, a worm gear (for preventing reverse rotation) must be interposed between the V-pulley and the drive motor to prevent the returning of the movable sheave of the V-pulley, with the result that the converting efficiency for converting the rotational torque of the drive motor into the thrust force of the movable sheave or vice versa will be decreased.

SUMMARY OF THE INVENTION

Accordingly, an object of the present invention is to provide a V-pulley control mechanism for a variable-speed drive of belt type in which returning of a movable sheave (reverse rotation of a drive motor) can be prevented without reducing converting efficiency for converting rotational torque of the drive motor into a thrust force of the movable sheave and vice versa.

To achieve the above object, according to the present invention, there is provided a V-pulley control mechanism for a variable-speed drive of belt type in which driving of a V-pulley of the variable-speed drive of belt type is controlled by a motor, wherein the V-pulley control mechanism is disposed between the motor and the V-pulley and comprises a clutch tightening portion, a clutch mechanism which can be tightened by the clutch tightening portion, and a one-way clutch portion.

When it is assumed that a rotational direction of the drive motor for decreasing a width of the primary V-pulley is a normal (forward) direction, as the drive motor is rotated in the normal direction, the clutch tightening portion tightens the clutch mechanism. In this case, since the rotational direction is a direction that the one-way clutch is rotated idly, the clutch mechanism and the one-way clutch portion are rotated integrally, with the result that the torque is transmitted to the V-pulley to shift the movable sheave toward the fixed sheave. As the drive motor is rotated in a reverse direction, the clutch tightening portion releases the clutch mechanism, with the result that the movable sheave is shifted away from the fixed sheave. When the drive motor is stopped, the rotation from the movable sheave is transmitted to the clutch tightening portion to tighten the clutch mechanism, with the result that the clutch mechanism and the one-way clutch portion try to be rotated integrally. However, since the rotational direction only results in engagement of the one-way clutch, the rotation from the movable sheave is stopped to prevent the returning of the movable sheave. Further, the reverse rotation of the drive motor can be prevented.

Further, the present invention provides a V-pulley control mechanism in which driving of a V-pulley of the variable-speed drive of belt type is controlled by a motor, wherein the V-pulley control mechanism is disposed between the motor and the V-pulley and comprises a clutch tightening portion, a clutch mechanism which can be tightened by the clutch tightening portion, and a one-way clutch portion.

Further, the clutch tightening portion may include a screw mechanism.

Further, the clutch tightening portion may include a ball screw mechanism.

Further, the clutch tightening portion may include a cam mechanism.

Furthermore, the movable sheave of the V-pulley can be urged in an axial direction by a second ball screw mechanism.

BRIEF DESCRIPTION OF THE DRAWINGS

FIGS. 6A, 6B, 6C and 6D are views showing a piston used in a cam mechanism according to the third embodiment, where

FIGS. 7A and 7B are views showing a clutch tightening member used in the cam mechanism according to the third embodiment, where

FIGS. 8A, 8B, 8C, 8D and 8E are views showing a piston used in a cam mechanism according to the third embodiment, where

FIGS. 9A, 9B and 9C are views showing a clutch tightening member used with the piston, where

DESCRIPTION OF THE PREFERRED EMBODIMENT

The present invention will now be explained in connection with embodiments thereof with reference to the accompanying drawings. Incidentally, in the drawings, the same elements are designated by the same reference numerals.
(First Embodiment)

Figure 1:
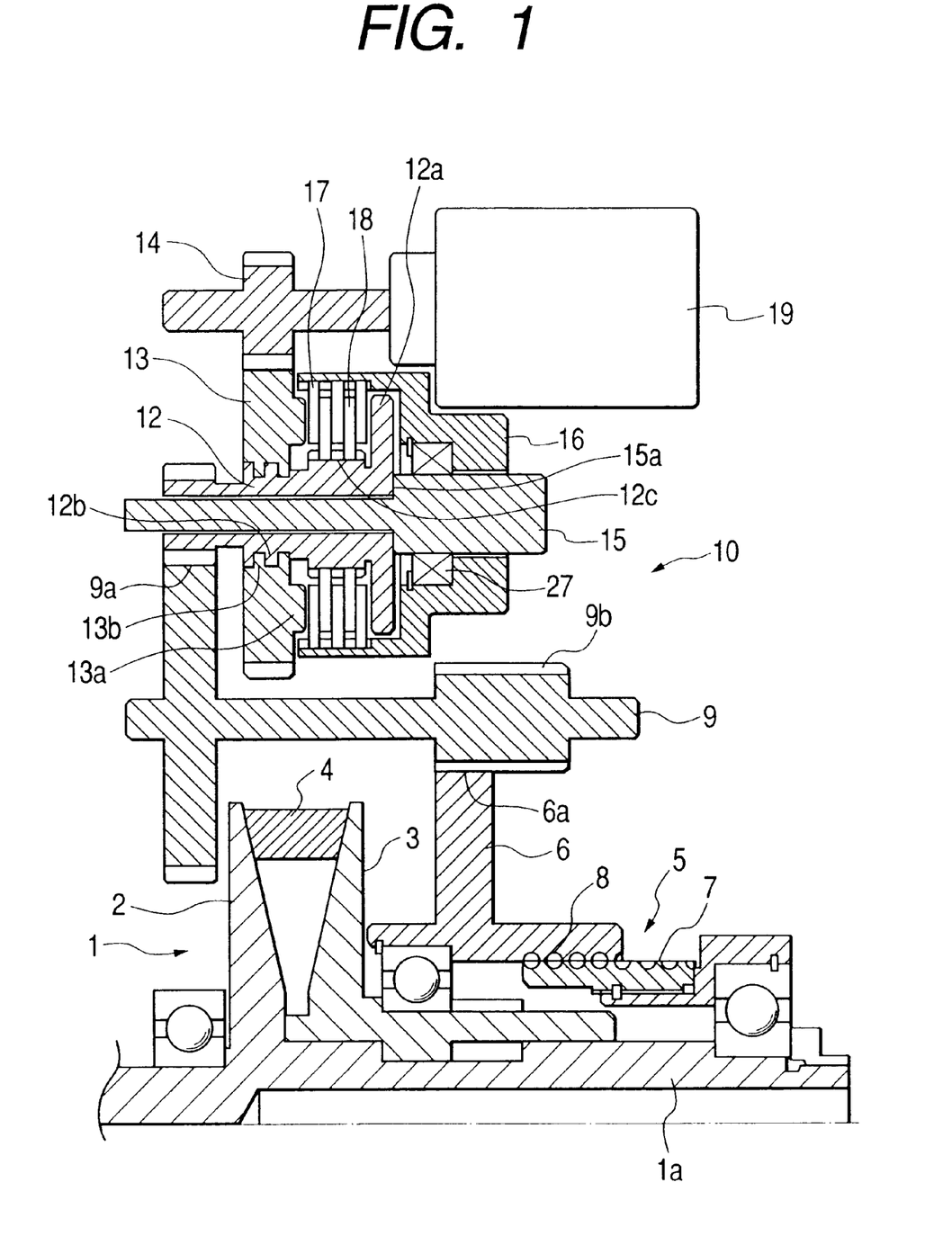
FIG. 1 is an axial sectional view showing a V-pulley control mechanism for a variable-speed drive of belt type according to a first embodiment of the present invention.

FIG. 1 is an axial sectional view showing a Vpulley control mechanism for a variable-speed drive of belt type according to a first embodiment of the present invention. The V-pulley control mechanism 10 is a primary pulley for the variable-speed drive of belt type and serves to control a V-pulley having V-shaped sectional space.

The V-pulley 1 has a fixed sheave 2 having an annular inclined surface inclined radially outwardly, and a movable sheave 3 shiftable in an axial direction and having an inclined surface opposed to the inclined surface of the fixed sheave 2 and defining a space having V-shaped cross-section therebetween. An endless V-belt 4 having V-shaped cross-section is engaged by the V-shaped space defined between the fixed sheave 2 and the movable sheave 3. As the V-belt 4, for example, a metallic frictional dry type belt or a resin dry type composite belt can be used.

The V-belt 4 is also engaged by a secondary pulley (not shown), so that input torque from an engine can be transmitted from an input shaft (not shown) to vehicle wheels (not shown) through the V-pulley 1, V-belt 4 and secondary pulley. In this case, a speed change ratio is determined by an opening degree (distance) of the movable sheave 3 of the V-pulley (primary pulley) 1 with respect to the fixed sheave 2 in the axial direction. For example, when the movable sheave 3 of the V-pulley 1 is opened (shifted to. the right in FIG. 1 in the axial direction) and accordingly the V-belt 4 is shifted axially inwardly, the V-belt 4 is positioned at a radial outermost position on the secondary pulley (not shown). In this case, the speed change ratio becomes a "Low" condition.

To the contrary, in the V-pulley 1, when the V-belt 4 is positioned at a position shown in FIG. 1 (position where the movable sheave 3 is closed as small as possible), the V-belt is positioned at a radial innermost position on the secondary pulley, so that the speed change ratio becomes an "overdrive" condition. Incidentally, the operation of the abovementioned variable speed drive is the same in the following embodiments.

The mechanism for shifting the movable sheave 3 of the V-pulley in the axial direction is a ball screw mechanism 5. The ball screw mechanism 5 comprises an inner sleeve 7 having a ball groove formed in its outer peripheral surface and rotatable with respect to a shaft portion 1a integral with the fixed sheave 2 but fixed in the axial direction, an outer sleeve 6 having a ball groove formed in its inner peripheral surface and into which the inner sleeve 7 is fitted, and balls 8 disposed between the ball groove of the inner sleeve 7 and the ball groove of the outer sleeve 6.

A gear portion 6a of the outer sleeve 6 is rotated by a driving force from the V-pulley control mechanism 10 which will be described later. As the outer sleeve 6 is rotated, due to the presence of the ball screw mechanism 5, the outer sleeve 6 is shifted in the axial direction. In this case, the movable sheave 3 which is integral with the outer sleeve 6 via a bearing is also shifted in the axial direction. As a result, the opening degree of the V-shaped space is changed, thereby displacing the V-belt 4 in the radial direction. Consequently, the speed change ratio is varied to accelerate or decelerate the vehicle. Incidentally, since the driving portion for the movable sheave 3 is constituted by the ball screw mechanism 5, the efficiency for converting the rotational torque into the thrust force or vice versa is enhanced.

Next, the V-pulley control mechanism 10 will be described in detail. As shown in FIG. 1, the V-pulley control mechanism 10 has a drive motor, i.e., an electric motor 19 such as a DC (direct current) motor, and rotational torque of the electric motor 19 is transmitted to an intermediate shaft 9 having a gear portion 9a meshed with a piston 12 through a gear integral with a rotary shaft of the electric motor 19, a clutch tightening member 13 meshed with the gear 14 and the piston 12 rotatably mounted on a fixed shaft 15. Thereafter, by the gear portion 6a of the outer sleeve 6 meshed with a gear portion 9b of the intermediate shaft 9 rotatably supported by a member (not shown), the rotational force is converted into a thrust force by the ball screw mechanism 5, thereby shifting the movable sheave 3 in the axial direction.

A threaded portion formed on an inner periphery of the clutch tightening portion 13 is engaged by a threaded portion 12b formed on an outer periphery of the piston 12. Further, the piston 12 is provided at its axial end with a substantially annular flange portion 12a extending radially outwardly. A housing 16 is rotatably fitted on the fixed shaft 15, and a oneway clutch portion 27 disposed between the housing 16 and the fixed shaft 15 is fitted on the fixed shaft 15. The clutch tightening portion 13 has projections 13a opposed to the flange portion 12a of the piston 12 along the axial direction.

Splines are formed on the inner periphery of the housing 16 and annular separator plates 17 are fitted on the splines. Further, splines 12c are formed on the outer periphery of the piston 12 between the threaded portion 12b and the flange portion 12a, and annular friction plates 18 are fitted on the splines. The separator plates 17 and the friction plates 18 are alternately arranged in an opposed a relationship. In the illustrated embodiment, although two friction plates and three separator plates are provided, the number of plates is not limited but can be determined in accordance with the required torque. Further, in order to obtain a required friction force, friction members (not shown) are adhered to both surfaces or a single surface of each friction plate 18.

In the above-mentioned arrangement, close contact between the friction plates 18 and the separator plates 17 which constitute the clutch mechanism is effected as follows. First of all, when the electric motor 19 is rotated in a normal (forward) direction, the clutch tightening portion is shifted to the right in FIG. 1 by the engagement between the threaded portion 13b and the threaded portion 12b. In this case, since the axial movement of the piston 12 is limited by a stepped portion 15a of the fixed shaft 15, as the clutch tightening portion 13 is shifted, the projections 13a urge the separator plates 17 and the friction plates 18 between the projections and the flange portion 12a of the piston 12, thereby achieving the tightened condition.

When the clutch mechanism is tightened, the clutch mechanism is rotated together with the one-way clutch portion 27 so that the rotational force is transmitted to the intermediate shaft 9 through the piston 12 and the gear 9a. The rotational torque transmitted to the intermediate shaft 9 is converted into the thrust force by the ball screw mechanism 5 and is transmitted to the V-pulley 1, thereby shifting the movable sheave 3 toward the fixed sheave 2.

When the electric motor is rotated in a reverse direction, since the clutch tightening portion 13 is shifted to the left in FIG. 1 in the axial direction, the frictional engagement between the friction plates 18 and the separator plates 17 is released, thereby releasing the clutch mechanism. As a result, the movable sheave 3 of the V-pulley 1 starts to be separated from the fixed sheave 2. Accordingly, the speed change ratio is changed from "Low" to "overdrive".

When the vehicle is running (for example, running at a constant speed), if the electric motor 19 is stopped, the rotation from the movable sheave 3 is transmitted to the clutch tightening portion 13, with the result that the clutch mechanism is tightened by the piston 12. In this case, although the clutch mechanism tries to be rotated together with the one-way clutch portion 27, since the rotation in this case is permitted only in the engaging direction of the one-way clutch portion 27, the rotation from the movable sheave 3 is stopped by the one-way clutch portion 27, with the result that the rotational force due to the returning of the movable sheave 3 is not transmitted to the electric motor 19. Accordingly, the reverse rotation of the electric motor 19 can be prevented. Therefore, the returning of the movable sheave (reverse rotation of the drive motor) can be prevented without reducing the efficiency for converting the rotational torque into the thrust force or vice versa.

(Second Embodiment)

Figure 2:
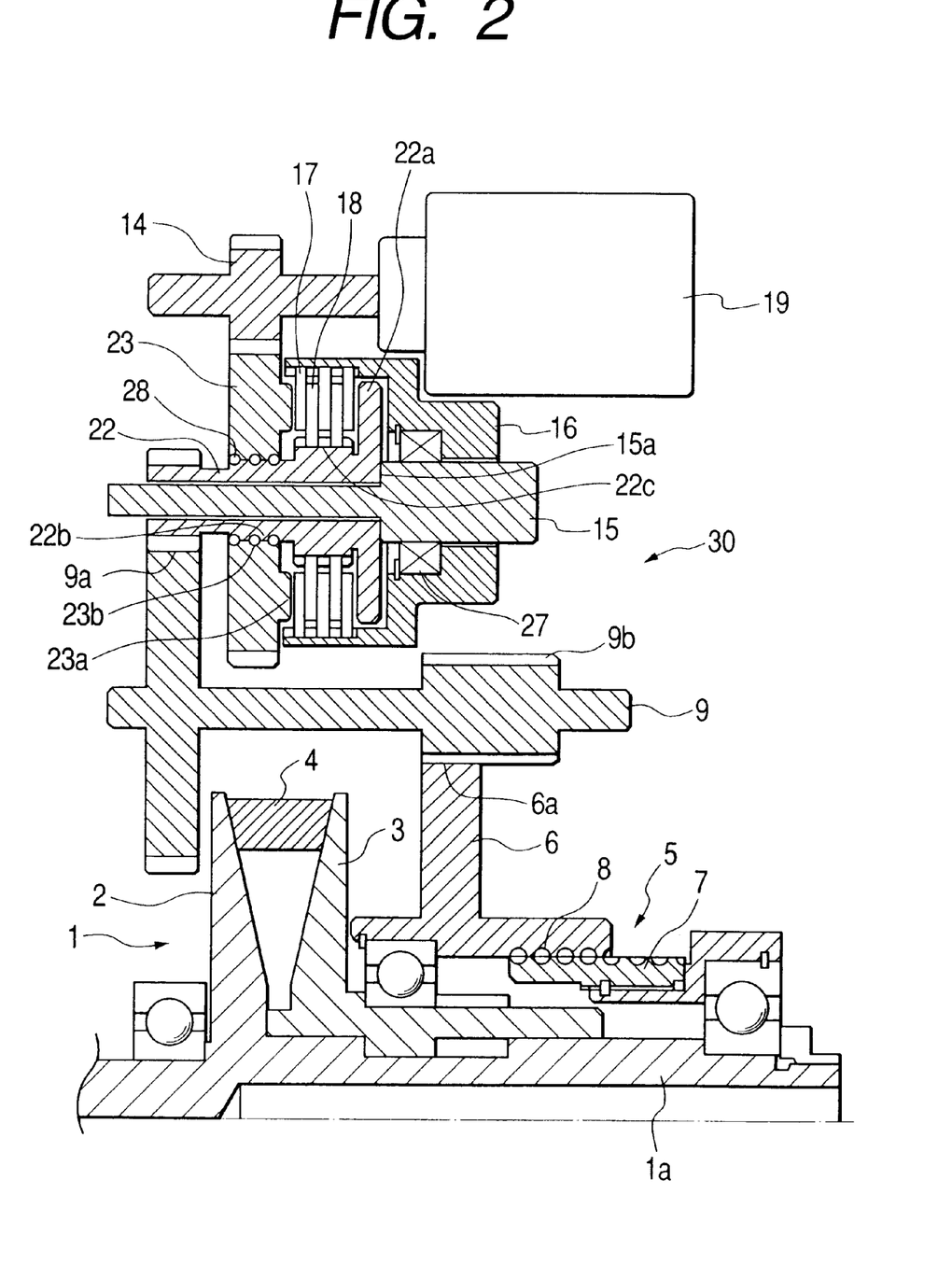
FIG. 2 is an axial sectional view showing a V-pulley control mechanism for a variable-speed drive of belt type according to a second embodiment of the present invention.

FIG. 2 is an axial sectional view showing a V-pulley control mechanism 30 for a variable speed drive of belt type according to a second embodiment of the present invention. Since the fundamental construction is the same as that of the first embodiment, explanation thereof will be omitted.

In this embodiment, a clutch tightening mechanism of the V-pulley control mechanism 30 differs from that in the first embodiment. A clutch tightening member 23 for tightening a clutch mechanism comprised of separator plates 17 fitted on splines formed on inner periphery of a housing 16 and friction plates 18 engaged by splines 22c of a piston 22, and the piston 22 are relatively shifted in an axial direction to move toward and away from each other by a driving force from an electric motor 19, similar to the first embodiment.

However, in the second embodiment, the clutch tightening member 23 is provided at its inner periphery with a ball groove 23b within which balls 28 are rolling, in place of the threaded portion. Correspondingly, a ball groove 22b is formed in outer periphery of the piston 22. Accordingly, there is provided a ball screw mechanism in which the clutch tightening member 23 and the piston 22 are relatively shifted in the axial direction by rolling the balls 28 between the ball groove 23b and the ball groove 22b.

The separator plates 17 and the friction plates 18 are urged against each other between projections 23a of the clutch tightening member 23 and a flange portion 22a of the piston 22 which are relatively shifted by the ball screw mechanism, thereby tightening the clutch mechanism. Further, when the clutch tightening member 23 is separated by rotating the electric motor 19 in the reverse direction, the clutch mechanism is released. In the second embodiment, since the ball screw mechanism is provided between the clutch tightening member 23 and the piston 22, the rotational torque from the electric motor 19 can be converted into the thrust force, thereby effecting the tightening and releasing of the clutch mechanism more smoothly. Further, since the ball screw mechanisms are used for driving the movable sheave 3 and for tightening and releasing the clutch mechanism, the efficiency for converting the rotational torque into the thrust force or vice versa can be enhanced entirely.

(Third Embodiment)

Figure 3:
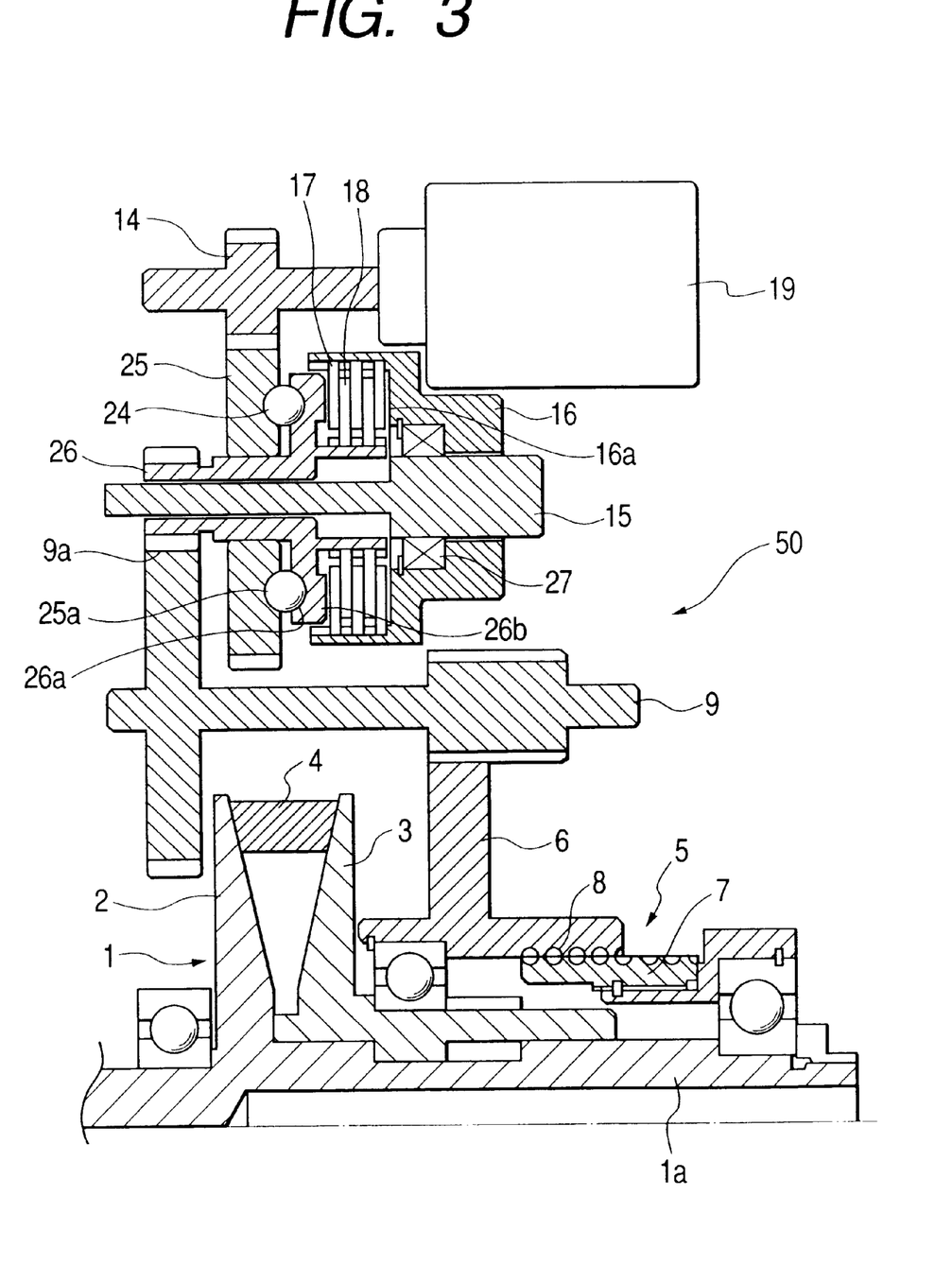
FIG. 3 is an axial sectional view showing a V-pulley control mechanism for a variable-speed drive of belt type according to a third embodiment of the present invention.

FIG. 3 is an axial sectional view showing a V-pulley control mechanism 50 for a variable speed drive of belt type according to a third embodiment of the present invention. Since the fundamental construction is the same as those of the first and second embodiments, explanation thereof will be omitted.

In this embodiment, a clutch tightening mechanism of the V-pulley control mechanism 50 differs from those in the first and second embodiments. A clutch tightening member 25 for tightening a clutch mechanism comprised of separator plates 17 and friction plates 18, and the piston 26 are relatively shifted in an axial direction to move toward and away from each other by a driving force from an electric motor 19, similar to the first and second embodiments.

However, in the third embodiment, inner periphery of the clutch tightening member 25 does not have not only a threaded portion but also a ball groove. Further, correspondingly, outer periphery of the piston does not also have not only a threaded portion but also a ball groove. In this embodiment, as means for tightening a clutch mechanism, cam grooves 26a are formed in an axial end face of the clutch tightening member 25 opposed to the clutch mechanism, and cam grooves 26a are formed in an axial end face of the piston opposed to the cam grooves 25a, and a ball cam 24 is disposed between the cam grooves.

When the electric motor 19 is driven (in the normal direction), the piston 26 is shifted to the right in FIG. 3 with respect to the clutch tightening member 25 in an axial direction by the above-mentioned cam mechanism. Thereafter, projections 26b provided on an axial end face of the piston abut against the separator plate 17. In this condition, when a cam pressure from the cam mechanism is applied, frictional engagement between the separator plates 17 and the friction plates 18 is started, so that the frictional engagement between the separator plates 17 and the friction plates 18 is achieved between the projections and an axial end face 16a of the housing 16, thereby tightening the clutch mechanism. As a result, the rotational torque of the electric motor is transmitted (as a thrust force) to the V-pulley 1 through a plurality of gears. Consequently, the width of the groove of the pulley is varied, thereby obtaining the required speed change ratio. In this embodiment, the clutch tightening member 25 is fixed in the axial direction by a mechanism (not shown). Further, although the axial movement of the piston 26 is not limited by the fixed shaft 15, such movement is limited by tightening the clutch mechanism.

Also in the third embodiment, the rotational torque of the electric motor 19 is converted into the thrust force for tightening the clutch mechanism by the above-mentioned cam mechanism. Incidentally, as shown in FIGS. 8A to 8E and FIGS. 9A to 9C, the cam mechanism may be a roller cam, in place of the ball cam.

(Other Examples of Clutch Mechanism)

Figure 4:
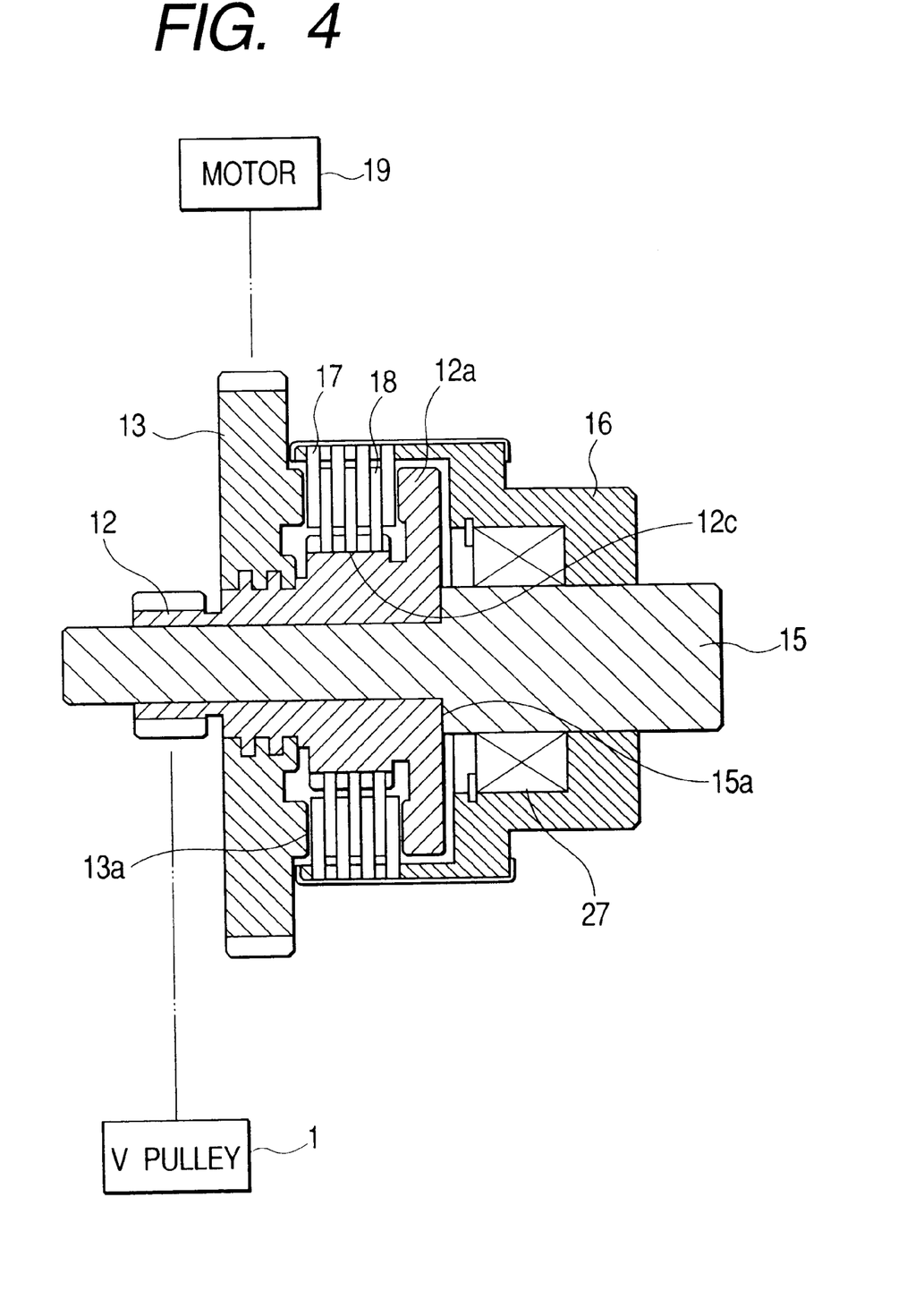
FIG. 4 is an axial sectional view showing an alteration of a clutch mechanism which can be applied to the V-pulley control mechanism according to the present invention.

FIG. 4 is an axial sectional view showing an alteration of a clutch mechanism which can be applied to the V-pulley control mechanism of the present invention. Although the fundamental construction is the same as that in the first embodiment, a construction of the clutch mechanism differs. Incidentally, the construction between the clutch tightening portion 13 and the electric motor 19 and the construction between the piston 12 and the V-pulley 1 are substantially the same as those in the first embodiment, illustration thereof will be omitted.

In FIG. 4, four separator plates 17 are provided, and three friction plates are disposed between the separator plates so that the respective plates are arranged alternately. In comparison with the above-mentioned embodiment, since the number of plates is great, greater torque can be handled.

Figure 5:
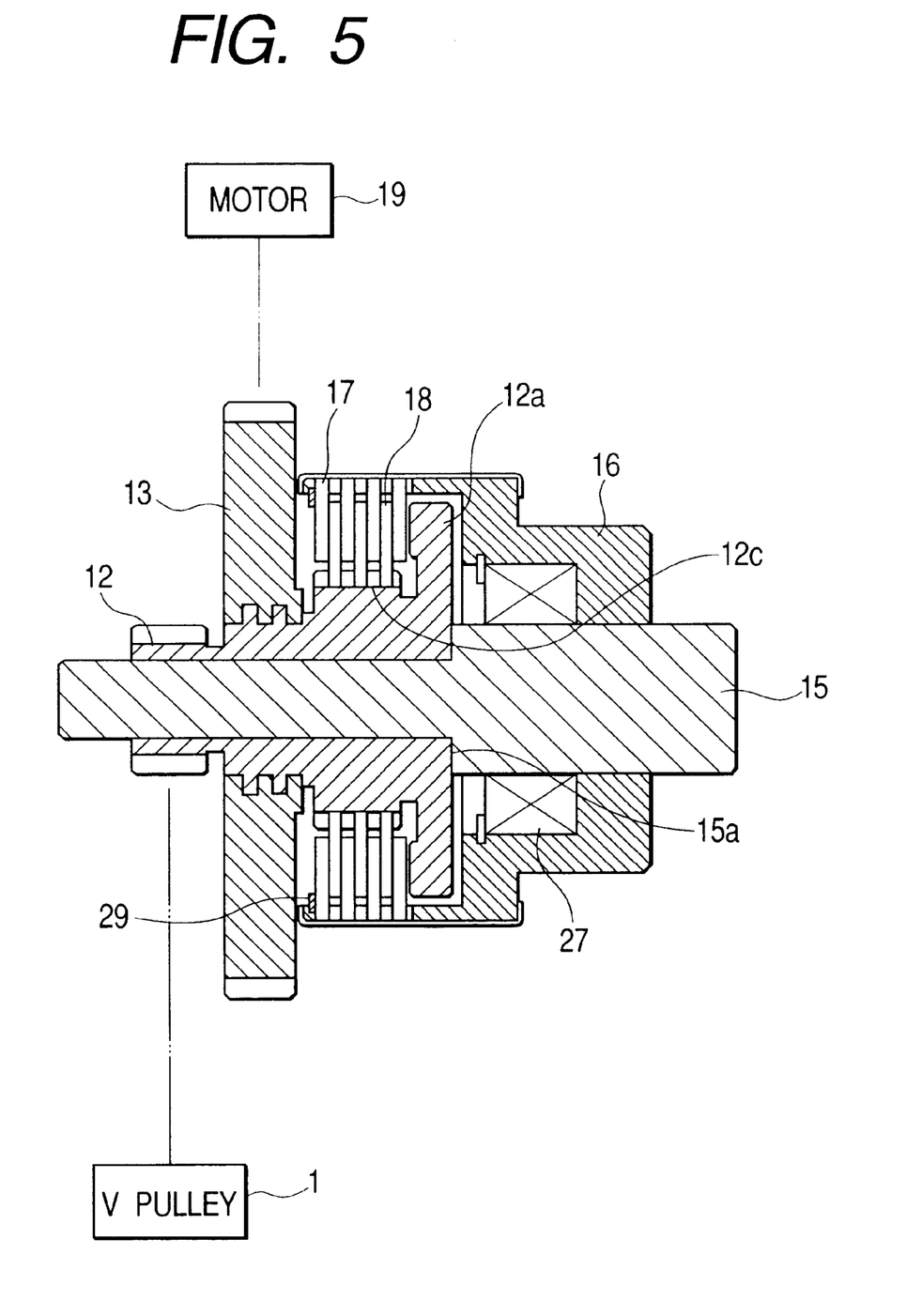
FIG. 5 is an axial sectional view showing another alteration of a clutch mechanism which can be applied to the V-pulley control mechanism according to the present invention.

FIG. 5 is an axial sectional view showing another alteration of a clutch mechanism which can be applied to the V-pulley control mechanism of the present invention. Although the fundamental construction is the same as that in the first embodiment, a construction of the clutch mechanism differs. Incidentally, the construction between the clutch tightening portion 13 and the electric motor 19 and the construction between the piston 12 and the V-pulley 1 are substantially the same as those in the first embodiment, illustration thereof will be omitted.

In FIG. 5, four separator plates 17 are provided, and three friction plates are disposed between the separator plates so that the respective plates are arranged alternately. In comparison with the above-mentioned embodiment, since the number of plates is great, greater torque can be handled. Further, in this alteration, the clutch tightening member 13 has no projection 13a. In this example, a snap ring 29 having a stopper function for the separator plate 17 is fitted on an axial end of the inner periphery of the housing 16 of the clutch mechanism near the clutch tightening member 13.

Accordingly, the tightening of the clutch mechanism is effected by frictionally engaging the separator plates 17 and the friction plates 18 between the flange portion 12a of the piston 12 and the snap ring 29. That is to say, when the clutch tightening member 13 is rotated by driving the electric motor 19, the piston 12 is shifted to the left in FIG. 5 along the axial direction by the screw mechanism. As a result, the separator plates 17 and the friction plates 18 are frictionally engaged with each other between the flange portion 12a of the piston 12 and the snap ring 29, thereby tightening the clutch mechanism. Consequently, the rotational torque of the electric motor is transmitted (as a thrust force) to the V-pulley 1 through a plurality of gears.

In the examples shown in FIGS. 4 and 5, although the connection between the piston 12 and the clutch tightening member 13 is effected by using the threading mechanism, this can be replaced by the ball screw mechanism shown in FIG. 2.

(Details of Cam Mechanism)

Figure 6A:
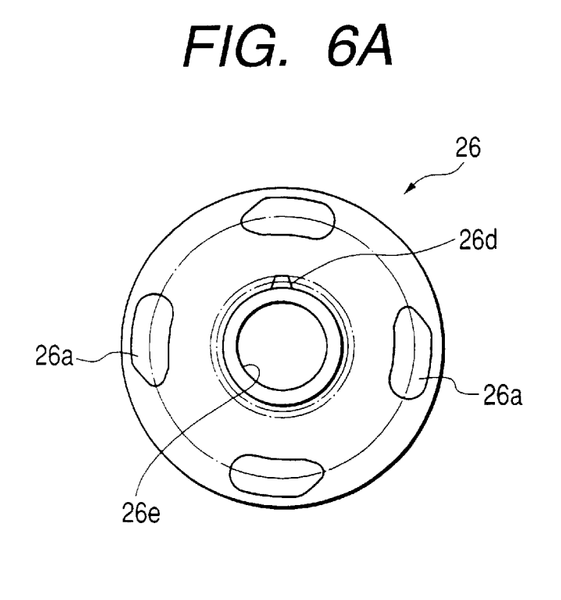
FIG. 6A is a front view showing a cam surface.
Figure 6B:
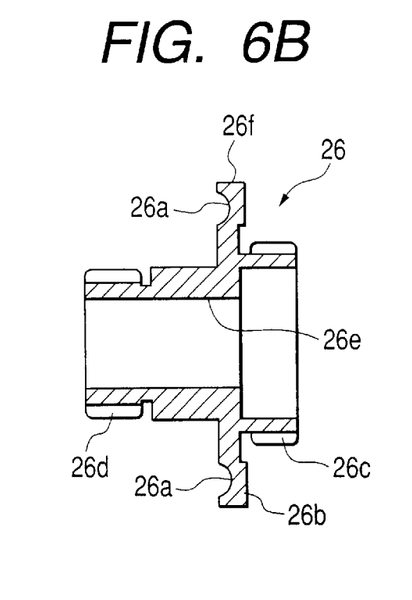
FIG. 6B is an axial sectional view.
Figure 6C:
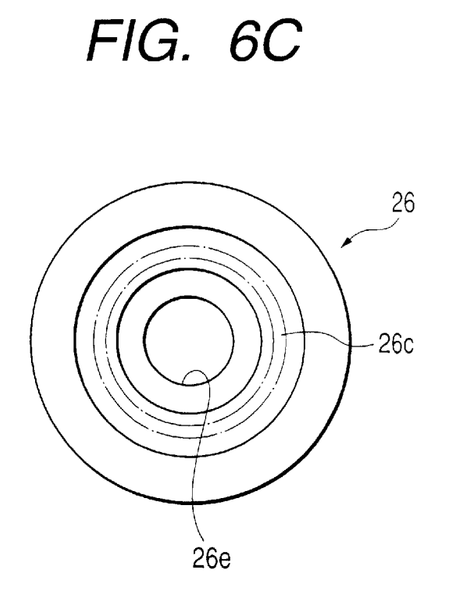
FIG. 6C is a back view.
Figure 6D:
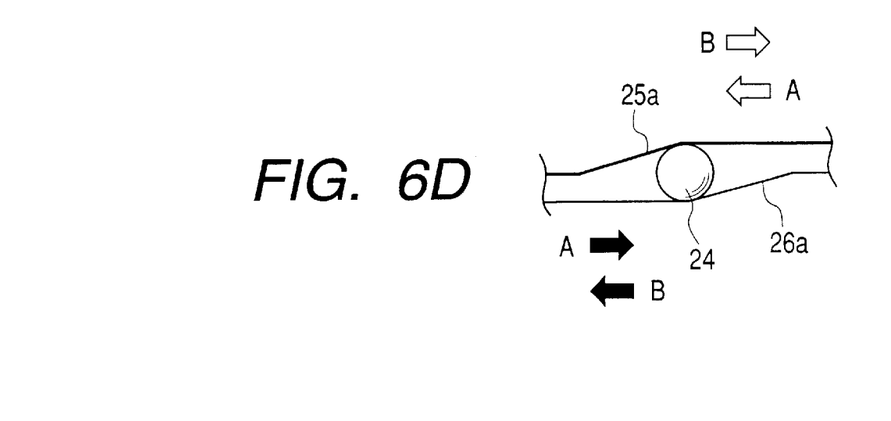
FIG. 6D is a sectional view showing engaging and disengaging directions of a ball cam.
Figure 7A:
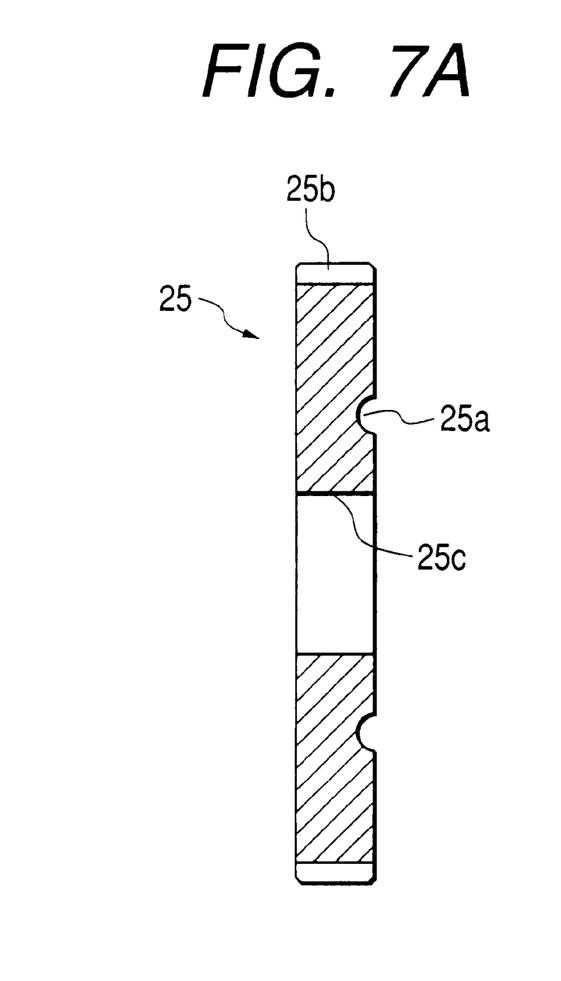
FIG. 7A is an axial sectional view.
Figure 7B:
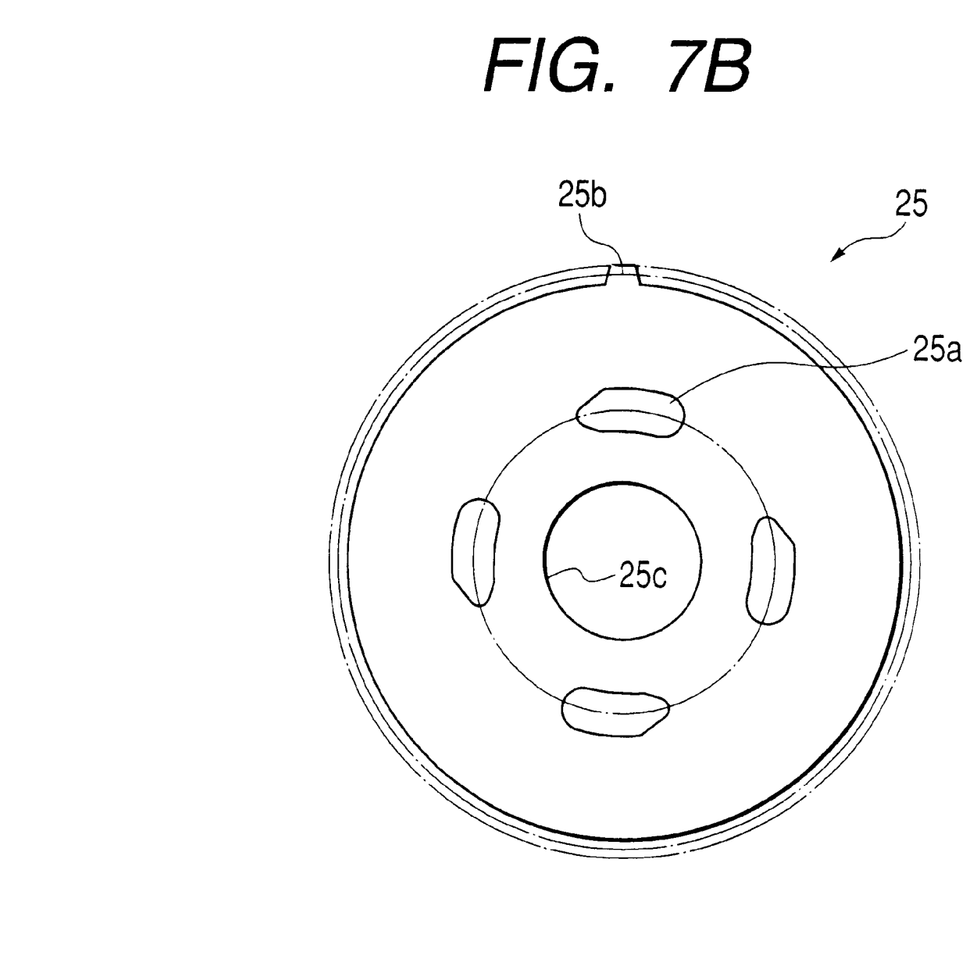
FIG. 7B is a front view showing a cam surface.

FIGS. 6A to 6D are views showing the piston 26 used in the cam mechanism according to the third embodiment, where FIG. 6A is a front view showing a cam surface, FIG. 6B is an axial sectional view, FIG. 6C is a back view, and FIG. 6D is a sectional view showing engaging and disengaging directions of the ball cam. FIGS. 7A and 7B are views showing the clutch tightening member 25 used in the cam mechanism according to the third embodiment, where FIG. 7A is an axial sectional view, and FIG. 7B is a front view showing a cam surface.

The piston 26 is a cylinder member having a circular through bore 26e into which the fixed shaft 15 is fitted. Accordingly, the piston 26 is rotatably supported by the fixed shaft 15. The gear portion 26d is provided an axial end of the piston 26, which gear portion is meshed with the gear portion 9a of the intermediate shaft 9, as shown in FIG. 3.

The splines 26c are provided outer periphery of the other axial end of the piston 26, and the friction plates 18 are fitted on the splines. An annular flange portion 26f is provided on an intermediate portion of the piston 26. At an axial direction of the flange portion 26f, projections 26b are provided on the flange surface near the splines 26c. The projections 26b urge the separator plates 17 or the friction plates 18 when the clutch mechanism is tightened by the axial movement of the piston 26.

At the axial direction of the flange portion 26f, cam grooves 26a are formed in a cam surface opposed to the clutch tightening member 25. As can be seen from FIG. 6A, four cam grooves 26a are provided equidistantly along a circumferential direction. However, the number and configuration of the cam grooves 26a can be selected appropriately and thus are not limited to the illustrated ones.

FIGS. 7A and 7B show the clutch tightening member 25 cooperating with the piston 26 to constitute the cam mechanism through the ball cam 24. The clutch tightening member 25 is a substantially annular member and is provided at its center with a through bore 25c into which the fixed shaft 15 is fitted. A gear portion 25b is provided on outer periphery of the clutch tightening member 25, which gear portion is engaged by the rotary shaft 14 of the electric motor 19 to receive the rotational torque of the electric motor 19.

An axial end face of the clutch tightening member 25 opposed to the cam surface of the piston 26 forms a cam surface in which cam grooves 25a are formed. As can be seen from FIG. 7B, four cam grooves 25a are provided equidistantly along a circumferential direction. However, the number and configuration of the cam grooves 25a can be selected appropriately and thus are not limited to the illustrated ones, so long as they correspond to the cam grooved 26a of the piston 26.

Now, the movement of the cam will be explained. As shown in FIG. 6D, the ball cam 24 pinched between the cam grooves 25a and the cam grooves 26a is rolling between the cam grooves. When the piston 26 and the clutch tightening member 25 are shifted in direction shown by the arrows A, respectively, the cam becomes a released condition; whereas, when they are shifted in directions shown by the arrows B, the cam becomes an engaged condition, thereby generating an axial urging force for tightening the clutch mechanism.

Figure 8A:
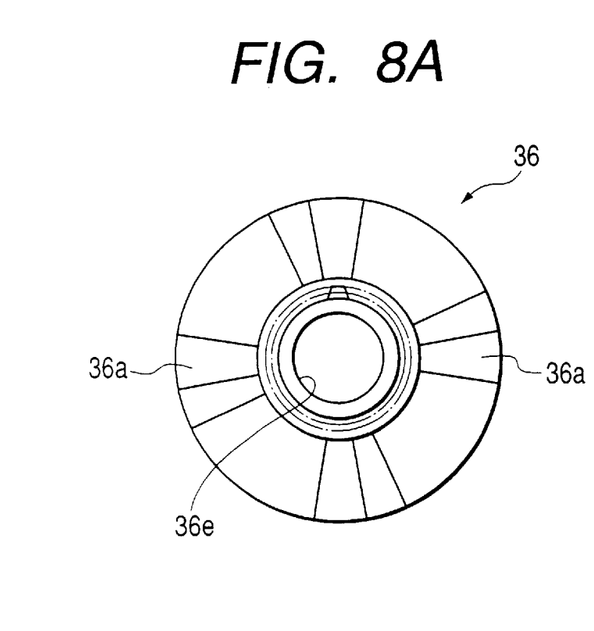
FIG. 8A is a front view showing a cam surface.
Figure 8B:
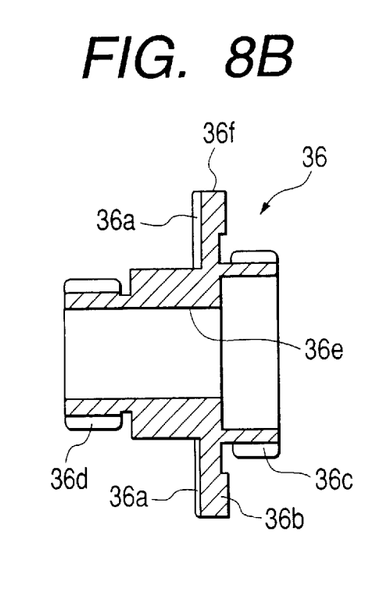
FIG. 8B is an axial sectional view.
Figure 8C:
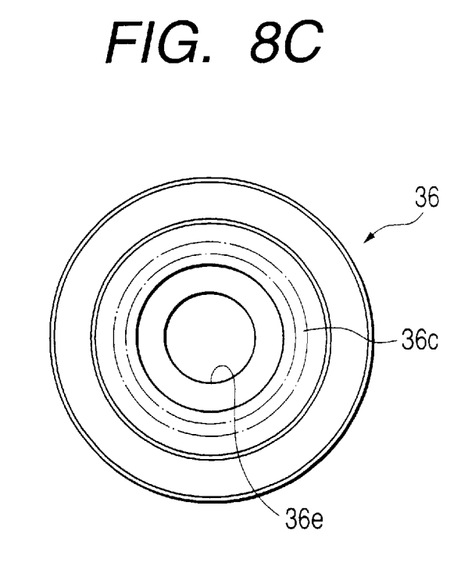
FIG. 8C is a back view.
Figure 8D:
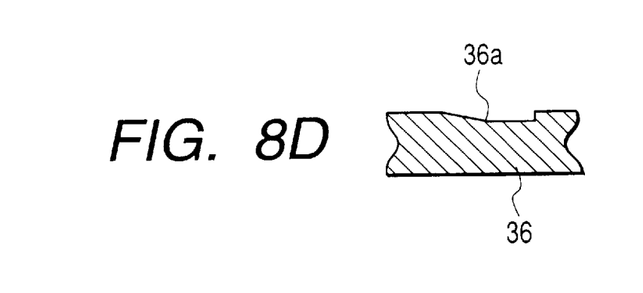
FIG. 8D is a sectional view of the cam surface.
Figure 8E:
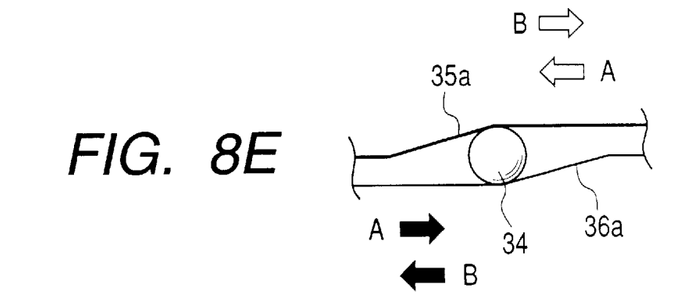
FIG. 8E is a sectional view showing engaging and disengaging directions of a roller cam.
Figures 9A, 9B, 9C:
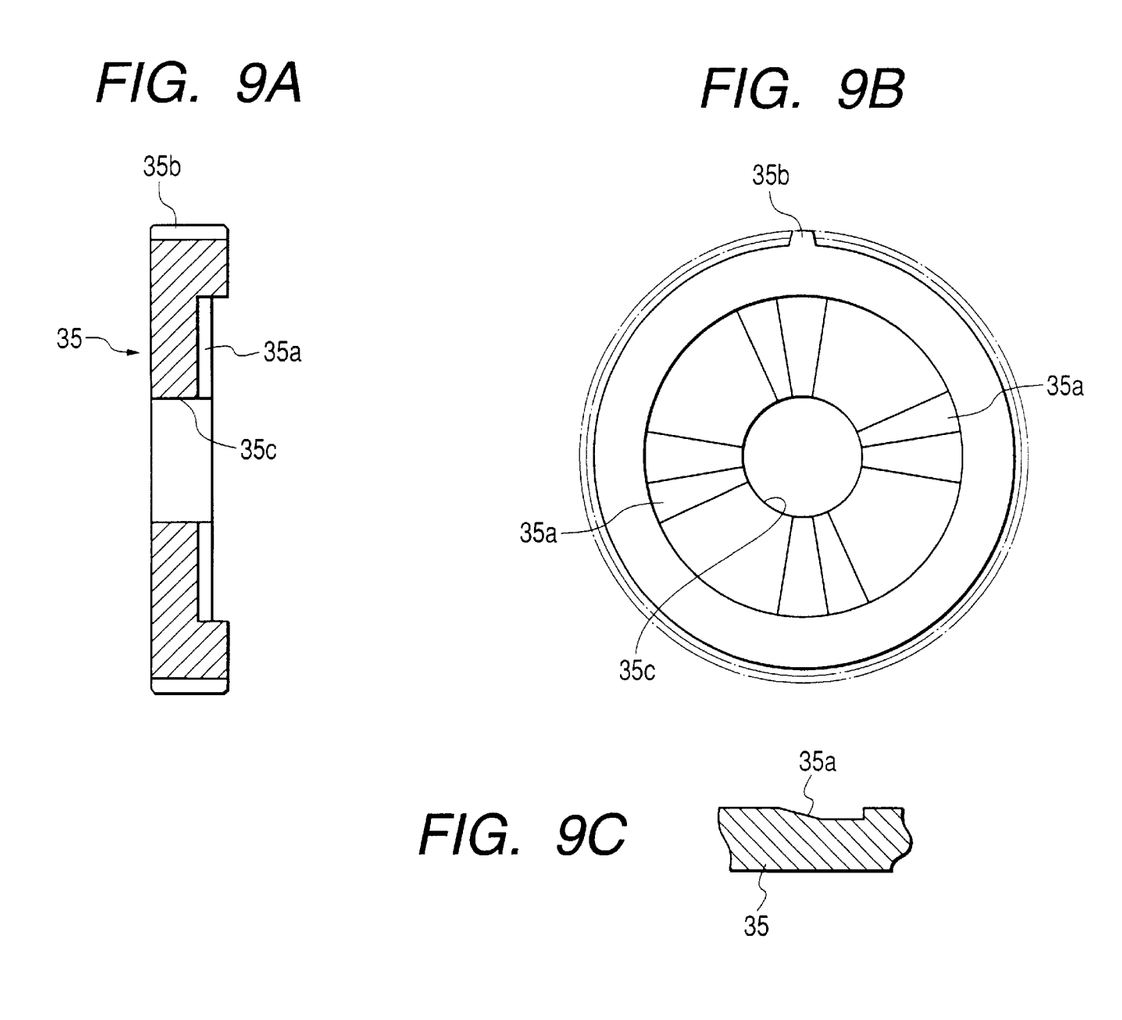
FIG. 9A is an axial sectional view.
FIG. 9B is a front view showing a cam surface.
FIG. 9C is a sectional view of the cam surface.

FIGS. 8A to 8E are views showing a piston 36 which can be used with the cam mechanism according to the third embodiment. Here, in place of the balls, rollers each having a taper enlarging radially outwardly are used as the cam member. FIG. 8A is a front view showing a cam surface, FIG. 8B is an axial sectional view, FIG. 8C is a back view, FIG. 8D is a sectional view of the cam surface, and FIG. 8E is a sectional view showing engaging and disengaging directions of the roller cam. FIGS. 9A to 9C are views showing a clutch tightening member 35 used with the piston 36 of FIGS. 8A to 8E, where FIG. 9A is an axial sectional view, FIG. 9B is a front view showing a cam surface, and FIG. 9C is a sectional view of the cam surface.

The piston 36 is a cylinder member having a circular through bore 36e into which the fixed shaft 15 is fitted. Accordingly, the piston 36 is rotatably supported by the fixed shaft 15. A gear portion 36d is provided an axial end of the piston 36, which gear portion is meshed with the gear portion 9a of the intermediate shaft 9, as shown in FIG. 3.

Splines 36c are provided outer periphery of the other axial end of the piston 36, and a plurality of friction plates 18 are fitted on the splines. An annular flange portion 36f is provided on an intermediate portion of the piston 36. At an axial direction of the flange portion 36f, projections 36b are provided on the flange surface near the splines 36c. The projections 36b urge the separator plates 17 or the friction plates 18 when the clutch mechanism is tightened by the axial movement of the piston 36.

At the axial direction of the flange portion 36f, cam grooves 36a extending from the through bore 36e toward radial outer periphery are formed in a cam surface opposed to a clutch tightening member 35 (FIGS. 9A to 9C). As can be seen from FIG. 8A, four cam grooves 36a are provided equidistantly along a circumferential direction. However, the number and configuration of the cam grooves 36a can be selected appropriately and thus are not limited to the illustrated ones. Further, as shown in FIG. 8D, each cam groove 36a includes an inclined portion on which a cam rollers 34 are rolling, and a flat portion contiguous with the inclined portion.

As shown in FIG. 8E, the cam rollers 34 pinched between the cam grooves 35a and the cam grooves 36a are rolling between the cam grooves. When the piston 36 and the clutch tightening member 35 are shifted in direction shown by the arrows A, respectively, the cam becomes a released condition; whereas, when they are shifted in directions shown by the arrows B, the cam becomes an engaged condition, thereby generating an axial urging force for tightening the clutch mechanism.

FIGS. 9A to 9C show the clutch tightening member 35 cooperating with the piston 36 to constitute the cam mechanism through the cam rollers 34. The clutch tightening member 35 is a substantially annular member and is provided at its center with a through bore 35c into which the fixed shaft 15 is fitted. A gear portion 35b is provided on outer periphery of the clutch tightening member 35, which gear portion is engaged by the rotary shaft 14 of the electric motor 19 to receive the rotational torque of the electric motor 19.

An axial end face of the clutch tightening member 35 opposed to the cam surface of the piston 36 forms a cam surface in which cam grooves 35a are formed. As can be seen from FIG. 9B, four cam grooves 35a are provided equidistantly along a circumferential direction. However, the number and configuration of the cam grooves 35a can be selected appropriately and thus are not limited to the illustrated ones, so long as they correspond to the cam grooved 36a of the piston 36.

In the above-mentioned embodiment and alterations, while the driving force generating means for generating the driving force for driving the V-pulley was the electric motor, so long as the required driving force is obtained, it is not limited to the electric motor. For example, oil pressure control can be used. However, in consideration of weight-lightening and compactness, the electric motor is preferable.

According to the present invention as mentioned above, the following advantages can be obtained.

Since the rotational torque from the movable sheave is received by the clutch mechanism and the one-way clutch, efficiency of the screw portion of the clutch tightening portion can be enhanced.

Accordingly, control efficiency of the V-pulley of the variable-speed drive of belt type can be enhanced, thereby making the drive motor compact and light-weighted and reducing the power consumption.

Further, when the clutch tightening portion has the ball screw mechanism, the conversion efficiency for converting the rotational torque into the thrust force is enhanced.

When the clutch tightening portion has the cam mechanism, the urging mechanism for clutch tightening can be simplified.

What is claimed is:

1. A V-pulley control mechanism for controlling by a motor a belt type continuously variable transmission having a stationary sheave and a movable sheave, wherein said V-pulley control mechanism is disposed in a route for transmitting a control torque of said motor to a device for adjusting a position of said movable sheave, and said V-pulley control mechanism comprises a clutch tightening portion, a clutch mechanism which can be tightened by said clutch tightening portion, and a one-way clutch portion.

2. A V-pulley control mechanism for a variable-speed drive of belt type according to claim 1, wherein said clutch tightening portion includes a threading mechanism.

3. A V-pulley control mechanism for a variable-speed drive of belt type according to claim 1, wherein said clutch tightening portion includes a ball screw mechanism.

4. A V-pulley control mechanism for a variable-speed drive of belt type according to claim 1, wherein said clutch tightening portion includes a cam mechanism.

5. A V-pulley control mechanism for a variable-speed speed drive of belt type according to claim 1, wherein a movable sheave of said V-pulley can be urged in an axial direction by a second ball screw mechanism.

6. A V-pulley control mechanism for a variable-speed drive of belt type according to claim 1, wherein said one-way clutch portion prevents said motor from reversibly rotating by a return torque from said movable sheave when said motor does not rotate.

* * * * *